United States Patent [19]

Miale et al.

[11] Patent Number: 4,500,422
[45] Date of Patent: Feb. 19, 1985

[54] CATALYSIS OVER ACTIVATED ZEOLITES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 552,542

[22] Filed: Nov. 16, 1983

Related U.S. Application Data

[63] Continuation-in-part of Ser. No. 355,415, Mar. 8, 1982, Pat. No. 4,427,788.

[51] Int. Cl.$^3$ .................. C10G 11/05; C10G 11/08; C10G 45/54
[52] U.S. Cl. ............................ 208/117; 208/120; 585/408; 585/415; 585/467; 585/470; 585/475; 585/481; 585/654
[58] Field of Search ............... 208/111, 120, 118, 119, 208/109, 110, 117

[56] References Cited

U.S. PATENT DOCUMENTS

| | | | |
|---|---|---|---|
| 2,328,846 | 9/1943 | Pitzer | 208/122 |
| 2,400,446 | 5/1946 | Veltman | 208/120 |
| 3,332,886 | 7/1967 | Wilson | 208/111 |
| 3,364,151 | 1/1968 | Disegna | 208/120 |
| 4,277,373 | 7/1981 | Sawyer et al. | 208/111 |

*Primary Examiner*—Delbert E. Gantz
*Assistant Examiner*—O. Chaudhuri
*Attorney, Agent, or Firm*—Alexander J. McKillop; Michael G. Gilman; Dennis P. Santini

[57] ABSTRACT

A process is provided for conducting organic compound conversion over a catalyst comprising a crystalline zeolite which has been treated by impregnation with an ammoniacal aluminum fluoride solution, contact with an ammonium salt solution, and calcination.

14 Claims, No Drawings

CATALYSIS OVER ACTIVATED ZEOLITES

CROSS-REFERENCE TO RELATED CASES

This application is a continuation-in-part of application Ser. No. 355,415, filed Mar. 8, 1982, now U.S. Pat. No. 4,427,788.

BACKGROUND OF THE INVENTION

1. Field of the Invention

This invention relates to a process for conducting organic compound conversion over a catalyst comprising a porous crystalline aluminosilicate zeolite, including high silica-containing porous crystalline zeolite materials, which has been treated by a method involving the steps of impregnating the crystalline material with an ammoniacal aluminum fluoride solution, contacting the impregnated material with warm aqueous solution of an ammonium salt, and calcining the ammonium salt solution contacted material. The resulting zeolite composition exhibits enhanced Bronsted acidity.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejection those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, $Na$, $K$ or $Li$ is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated convenient symbols, as illustrated by zeolite ZSM-5 (U.S. Pat. No. 3,702,886).

High silica-containing zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The method for treating the zeolite for use in this invention permits the preparation of certain high silica-containing materials which have all the desirable properties inherently possessed by such high silica materials and, yet, have an acid activity which heretofore has only been possible to be achieved by materials having a higher aluminum content in their "as synthesized" form. It further permits valuable activation of crystalline zeolites having much lower silica-to-alumina mole ratios.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio or with treatment of any crystalline zeolite with ammoniacal aluminum flourides in the above manner.

SUMMARY OF THE INVENTION

The present invention relates to a novel process for converting organic compounds over a catalyst comprising a zeolite of altered acativity resulting from impregnating the crystalline zeolite material with an ammoniacal aluminum fluoride solution, contacting the impregnated material with a warm aqueous solution of an ammonium salt (e.g. $NH_4NO_3$) and calcining the ammonium salt solution contacted material. The resulting zeolite material exhibits enhanced Bronsted acidity and, therefore, improved acid activity toward catalysis of numerous chemical reactions, such as, for example, cracking of organic, e.g. hydrocarbon, compounds.

DESCRIPTION OF SPECIFIC EMBODIMENTS

This is a continuation-in-part of the application resulting in U.S. Pat. No. 4,427,788, entirely incorporated herein by reference.

The expression "high silica-containing crystalline material" is intended to define a crystalline structure which has an initial silica-to-alumina ratio of 70 or more, especially greater than 100 and more especially greater than 500, up to and including those highly siliceous materials where the initial silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, chromium, etc. Thus, the starting materials utilized in the novel process of this invention may have an initial silica-to-alumina ratio of 70 or more, especially greater than about 100 (irrespective of what other materials or metals are present in the crystal structure).

The zeolite starting materials utilized herein, including those having an initial silica-to-alumina mole ratio greater than about 100, may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers. Examples of onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.) When M is a heteroatom in an alicyclic, heteroalicyclic or heteroaromatic structure, such structure may be, as non-limiting examples,

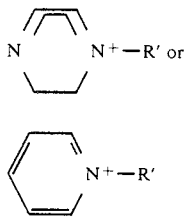

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$[(CH_3)_3As^+(CH_2)_6N^+(CH_3)_3](Cl^-)_2$, $[(C_3H_7)_3N^+(CH_2)_{10}N^+(C_3H_7)_3](Cl^-)_2$, $[(C_6H_5)_3N^+(C_2H_4)_{16}P^+(C_6H_5)_3](OH^-)_2$, $[(C_{18}H_{37})_3P^+(C_2H_2)_3P^+(CH_3)_3](Cl^-)_2$, $[(C_2H_5)_3N^+(C_6H_4)N^+(C_2H_5)_3](Br^-)_2$, $[(CH_3)_3Sb^+(CH_2)_{10}Sb^+(CH_3)_3](Cl^-)_2$, $[(C_6H_5)_3Sb^+(CH_2)_4N^+(CH_3)_3](OH^-)_2$, $[(CH_3)_3Bi^+(CH_2)_{18}N^+(CH_3)_3](Br^-)_2$, $[(C_2H_3)_3N^+(CH_2)_{50}N^+(C_2H_3)_3](OH^-)_2$, $[(C_6H_5)_3P^+(C_2H_2)_6As^+(CH_3)_3](Cl^-)_2$, $[(CH_3)_3N^+(CH_2)_6N^+(CH_3)_3](Cl^-)_2$, and

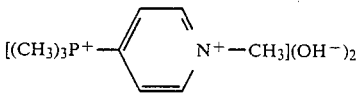

The process of treating the zeolite for use herein is simple and easy to carry out although the results therefrom are dramatic. The process is carried out by impregnating the crystalline zeolite with an ammoniacal aluminum fluoride solution, said impregnation being conducted at a temperature of from about 0° C. to about 100° C., preferably from about ambient to about 50° C. The impregnated zeolite is then contacted with a warm, i.e. 50° C. to 90° C., aqueous solution of from 0.1 to 2 Normal ammonium salt, e.g. 1N NH$_4$NO$_3$, and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The ammoniacal aluminum fluoride solution is composed of an aluminum fluoride, such as, for example, one selected from the group consisting of AlF$_3$, (NH$_4$)$_3$AlF$_6$, (NH$_4$)$_2$AlF$_5$ and NH$_4$AlF$_4$, and concentrated ammonium hydroxide or liquid ammonia. The amount of aluminum fluoride in said solution will be from about 0.1 weight percent to about 5 weight percent of the whole, with the amount of aluminum fluoride per gram of crystalline zeolite being treated during the impregnation step being from about 0.1 to about 1 gram/gram.

The ammonium salt solution contacting step may be conducted for a period of time of from about 1 hour to about 20 hours. The ammonium salt used is not narrowly critical and will normally be an inorganic salt such as ammonium nitrate, ammonium sulfate, ammonium chloride, etc.

Activation of zeolites with fluorides is generally believed to require the presence of an alumina material as a source of activation aluminum. In the above method, however, aluminum is provided by the aluminum fluoride component of the ammoniacal impregnating solution, with the ammonia or ammonium hydroxide serving as an alumination vehicle transporting aluminum into the zeolite channels where new acid sites are formed. Therefore, supported or unsupported zeolites, including those which have undergone severe thermal or hydrothermal deformation, may be suitably activated by the above method.

Of the high silica zeolite materials advantageously treated in accordance herewith, zeolites ZSM-5, ZSM-11, ZSM-5/ZSM-11 intermediate, ZSM-12, ZSM-23, ZSM-35, ZSM-38 and ZSM-48 are particularly noted. ZSM-5 is described in U.S. Pat. Nos. 3,702,886 and Re 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate is described in U.S. Pat. No. 4,229,424, the entire contents thereof being incorporated herein by reference. ZSM-12 is described in U.S. Pat. No. 3,832,449, the entire contents of which are incorporated herein by reference. ZSM-23 is described in U.S. Pat. No. 4,076,842, the entire teaching of which is incorporated herein by reference. The entire contents of U.S. Pat. Nos. 4,016,245, 4,046,859 and 4,397,827 describing ZSM-35, ZSM-38 and ZSM-48, respectively, are incorporated herein by reference.

In general, organic compounds such as, for example, those selected from the group consisting of hydrocarbons, alcohols and ethers, are converted to conversion products such as, for example, aromatics and lower molecular weight hydrocarbons, over the activity enhanced crystalline zeolite prepared as above by contact under organic compound conversion conditions including a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with rection conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with rection conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with rection conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In practicing a particularly desired chemical conversion process, it may be useful to incorporate the above-described activity enhanced material with a matrix comprising a material resistant to the temperature and other conditions employed in the process. Such matrix material is useful as a binder and imparts resistance to the catalyst for the severe temperature, pressure and reactant feed stream velocity conditions encountered in many cracking processes.

Useful matrix materials include both synthetic and naturally occurring substrates, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and matrix, on an anhydrous basis, may vary widely with the activated zeolite content ranging from about 1 to about 99 percent by weight and more usually in the range of about 5 to about 80 percent by weight of the total dry composite.

The following examples will illustrate the novel method of the present invention.

EXAMPLE 1

Zeolite ZSM-5 was prepared from a reaction mixture containing tetraalkylammonium ions and having a silica-to-alumina mole ratio of about 26,000:1 (65 ppm framework alumina, 110 ppm bulk alumina and 0.23 percent sodium). A sample of the ZSM-5 product of this example was calcined for 30 minutes at 538° C.

EXAMPLE 2

An uncalcined portion of the zeolite prepared in Example 1 was vacuum impregnated with saturated non-ammoniacal, aqueous aluminum fluoride solution, i.e. $(NH_4)_3AlF_6$ at 25° C. After 30 minutes impregnation contact, the sample of zeolite was dried at 130° C. and contacted three times over an 18 hour period with 1N $NH_4NO_3$ (26° C.). The sample was then washed, dried at 130° C. and calcined at 538° C.

EXAMPLE 3

An uncalcined portion of zeolite prepared in Example 1 was vacuum impregnated at 25° C. with a saturated ammoniacal solution of $(NH_4)_3AlF_6$ (in concentrated $NH_4OH$). It was then dried, treated with 1N $NH_4NO_3$ and calcined as in Example 2.

EXAMPLE 4

Another uncalcined portion of the zeolite prepared in Example 1 was mixed with an equal weight of $(NH_4)_3AlF_6$ and added to an equal volume of solid ammonia. The ammonia was melted at about $-70°$ C. and the resultant thin slurry was mixed thoroughly for 30 minutes at $-70°$ to $-30°$ C. The excess ammonia boiled off and the zeolite was heated with $NH_4NO_3$ (80° C.). The $(NH_4)_3AlF_6$ was washed out by the process. The resultant zeolite was then calcined as in Example 3.

EXAMPLE 5

Another uncalcined portion of the zeolite prepared in Example 1 was treated as in Example 3 except that a boron fluoride, i.e. $NH_4BF_4$, was substituted for the aluminum fluoride, i.e. $(NH_4)_3AlF_6$.

EXAMPLE 6

Zeolite ZSM-5 was prepared having a silica-to-alumina mole ratio of 70:1. A sample of this zeolite was calcined in air for 60 minutes at 1000° C.

EXAMPLE 7

A sample of the zeolite product of Example 6 was used for methanol conversion to hydrocarbons at 370° C., 0 psig and a WHSV of 1.4. After 15 days on stream, the zeolite was regenerated by heating to 538° C. in air for 30 minutes. The regenerated zeolite was then impregnated with a boron fluoride, i.e. $NH_4BF_4$, and treated with $NH_4NO_3$ and calcined as in Example 5.

EXAMPLE 8

After measuring the Alpha Value of the product zeolite of Example 7 in the Alpha Test, hereinafter described, it was then treated again as in Example 6 except that the impregnation was with an alkali metal fluoride, i.e. NaF, rather than the boron fluoride.

EXAMPLE 9

After measuring the Alpha Value of the product zeolite of Example 8, it was then treated by the present method with an ammoniacal aluminum fluoride, ammonium salt solution and calcined as in Example 4.

EXAMPLE 10

Zeolite ZSM-5 was prepared having a silica-to-alumina mole ratio of 250:1. The zeolite was activated by treatment with volatile $AlCl_3$ and calcination for 30 minutes at 538° C. in air.

EXAMPLE 11

After measuring the Alpha Value of the activated zeolite product of Example 10, it was then treated by the present method as in Example 3.

A sample of each final product of Example 1 through 11 was subjected to the Alpha Test to measure catalytic activity. The results of these tests are listed below:

| Example | Alpha Value |
| --- | --- |
| 1 | less than 0.1 |
| 2 | 1.0 |
| 3 | 30 |
| 4 | 36 |
| 5 | 0.7 |
| 6 | 0.5 |
| 7 | 2.2 |
| 8 | 0.2 |
| 9 | 8 |
| 10 | 29 |
| 11 | 60 |

It is observed from the above results that the present method is highly useful for enhancing acid catalytic activity of crystalline zeolites, including those having a silica-to-alumina mole ratio greater than 100, which have, in turn, been impregnated with an ammoniacal aluminum fluoride solution, contacted with a warm aqueous solution of an ammonium salt, and calcined.

As is known in the art, the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1. The Alpha Test is described in U.S. Pat. No. 3,354,078 and in The Journal of Catalysis, Vol. IV, pp. 522–529 (August 1965).

What is claimed is:

1. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst comprising a zeolite composition prepared by a method which comprises impregnating a zeolite having an initial silica-to-alumina mole ratio of 70 or more with an ammoniacal aluminum fluoride solution at a temperature of from about 0° C. to about 100° C., said solution comprising from about 0.1 to about 5 weight percent of an aluminum fluoride in solution with at least one member selected from the group consisting of ammonium hydroxide and ammonia, contacting the impregnated zeolite with a warm aqueous 0.1 to 2 Normal solution of an ammonium salt, and calcining the ammonium salt solution contacted material at a temperature of from about 200° C. to about 600° C.

2. The process of claim 1 wherein said zeolite has a silica-to-alumina mole ratio greater than about 100.

3. The process of claim 1 wherein said zeolite has a silica-to-alumina mole ratio greater than about 500.

4. The process of claim 1 wherein said aluminum fluoride is at least one member seleted from the group consisting of $AlF_3$, $(NH_4)_3AlF_6$, $(NH_4)_2AlF_5$ and $NH_4AlF_4$.

5. The process of claim 1 wherein said ammonium salt solution is ammonium nitrate, ammonium sulfate or ammonium chloride.

6. The process of claim 1 wherein said zeolite has the structure of ZSM-5, ZSM-11, ZSM-5/ZSM-11 intermediate, ZSM-12, ZSM-23, ZSM-35, ZSM-38 or ZSM-48.

7. The process of claim 6 wherein said zeolite has the structure of ZSM-5 or ZSM-11.

8. The process of claim 1 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 20 $hr^{-1}$.

9. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst comprising a zeolite composition prepared by a method which comprises impregnating a zeolite having an initial silica-to-alumina mole ratio of 70 or more and the structure of ZSM-5 with an ammoniacal aluminum fluoride solution at a temperature of from about 0° C. to about 100° C., said solution comprising from about 0.1 to about 5 weight percent of an aluminum fluoride in solution with at least one member selected from the group consisting of ammonium hydroxide and ammonia, contacting the impregnated zeolite with a warm aqueous 0.1 to 2 Normal solution of an ammonium salt, and calcining the ammonium salt solution contacted material at a temperature of from about 200° C. to about 600° C.

10. The process of claim 9 wherein said zeolite has a silica-to-alumina mole ratio greater than about 100.

11. The process of claim 9 wherein said zeolite has a silica-to-alumina mole ratio greater than about 500.

12. The process of claim 9 wherein said aluminum fluoride is at least one member selected from the group consisting of $AlF_3$, $(NH_4)_3AlF_6$, $(NH_4)_2AlF_5$ and $NH_4AlF_4$.

13. The process of claim 9 wherein said ammonium salt solution is ammonium nitrate, ammonium sulfate or ammonium chloride.

14. The process of claim 9 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 20 $hr^{-1}$.

* * * * *